(12) United States Patent
Kehlet et al.

(10) Patent No.: US 9,612,519 B2
(45) Date of Patent: Apr. 4, 2017

(54) METHOD AND SYSTEM FOR ORGANISING IMAGE RECORDINGS AND SOUND RECORDINGS

(71) Applicant: KEHLET KORREKTUR, Tromsø (NO)

(72) Inventors: Jannik Dam Kehlet, Tromso (NO); Benjamin Dam Kehlet, Lier (NO)

(73) Assignee: PRAQO AS, Tromsø (NO)

( * ) Notice: Subject to any disclaimer, the term of this patent is extended or adjusted under 35 U.S.C. 154(b) by 0 days.

(21) Appl. No.: 14/428,045

(22) PCT Filed: Oct. 1, 2013

(86) PCT No.: PCT/EP2013/070425
§ 371 (c)(1),
(2) Date: Mar. 13, 2015

(87) PCT Pub. No.: WO2014/053474
PCT Pub. Date: Apr. 10, 2014

(65) Prior Publication Data
US 2015/0241766 A1 Aug. 27, 2015

Related U.S. Application Data

(60) Provisional application No. 61/708,074, filed on Oct. 1, 2012.

(30) Foreign Application Priority Data

Oct. 1, 2012 (NO) .................................. 20121116

(51) Int. Cl.
*G11B 27/10* (2006.01)
*G11B 27/28* (2006.01)
(Continued)

(52) U.S. Cl.
CPC ......... *G03B 31/04* (2013.01); *G06F 17/3002* (2013.01); *G11B 27/105* (2013.01);
(Continued)

(58) Field of Classification Search
CPC ... G11B 27/00; G06F 17/3002; H04N 21/222; H04N 21/242; H04N 21/4307
See application file for complete search history.

(56) References Cited

U.S. PATENT DOCUMENTS 3,528,731 A   9/1970  Bird
4,646,167 A   2/1987  Denecke
(Continued)

FOREIGN PATENT DOCUMENTS

EP   1463301   9/2004
EP   1465193   10/2004
(Continued)

OTHER PUBLICATIONS

Chris Price, "Ambient Clockit Controller ACC501, Operating manual" Dec. 31, 2007.
(Continued)

*Primary Examiner* — Huy T Nguyen
(74) *Attorney, Agent, or Firm* — Christian D. Abel

(57) ABSTRACT

Method and system for organising image recordings of takes recorded by an image recorder and sound recordings of the takes recorded by a sound recorder are provided. Each of the image recordings comprises a visual information code (VIC). Each of the sound recordings comprises an audible information code (AIC). The method comprises the steps of: searching through the digital image recordings for the visual information codes (VIC) and decoding it to acquire identification code (IC), searching through the digital sound recordings for the audible information codes (AIC) and decoding it to acquire identification code (IC), and organ-
(Continued)

ising sets of image recordings and sound recordings based on their identification codes (IC).

11 Claims, 13 Drawing Sheets

(51) Int. Cl.
*G03B 31/04* (2006.01)
*G11B 27/11* (2006.01)
*G06F 17/30* (2006.01)
*H04N 5/222* (2006.01)

(52) U.S. Cl.
CPC .............. *G11B 27/11* (2013.01); *G11B 27/28* (2013.01); *H04N 5/222* (2013.01)

(56) References Cited

U.S. PATENT DOCUMENTS

| | | |
|---|---|---|
| 5,457,507 A | 10/1995 | Berardi |
| 5,638,151 A | 6/1997 | Berardi |
| 6,831,729 B1 | 12/2004 | Davies |
| 7,200,320 B1 | 4/2007 | Denecke |
| 8,271,872 B2 * | 9/2012 | Salvucci .............. G11B 27/034 715/202 |
| 8,483,540 B2 * | 7/2013 | Doser .................... G11B 27/10 382/181 |
| 2010/0042650 A1 * | 2/2010 | Roenning ............ G11B 27/105 386/282 |

FOREIGN PATENT DOCUMENTS

| | | |
|---|---|---|
| EP | 1978658 | 10/2008 |
| WO | 2008/073083 | 6/2008 |
| WO | 2009/114723 | 9/2009 |

OTHER PUBLICATIONS

Chris Price, "Ambient Clockit Lanc Logger ALL601, Descriptions and intructions for use" Aug. 28, 2007.

* cited by examiner

Fig. 1: Prior art

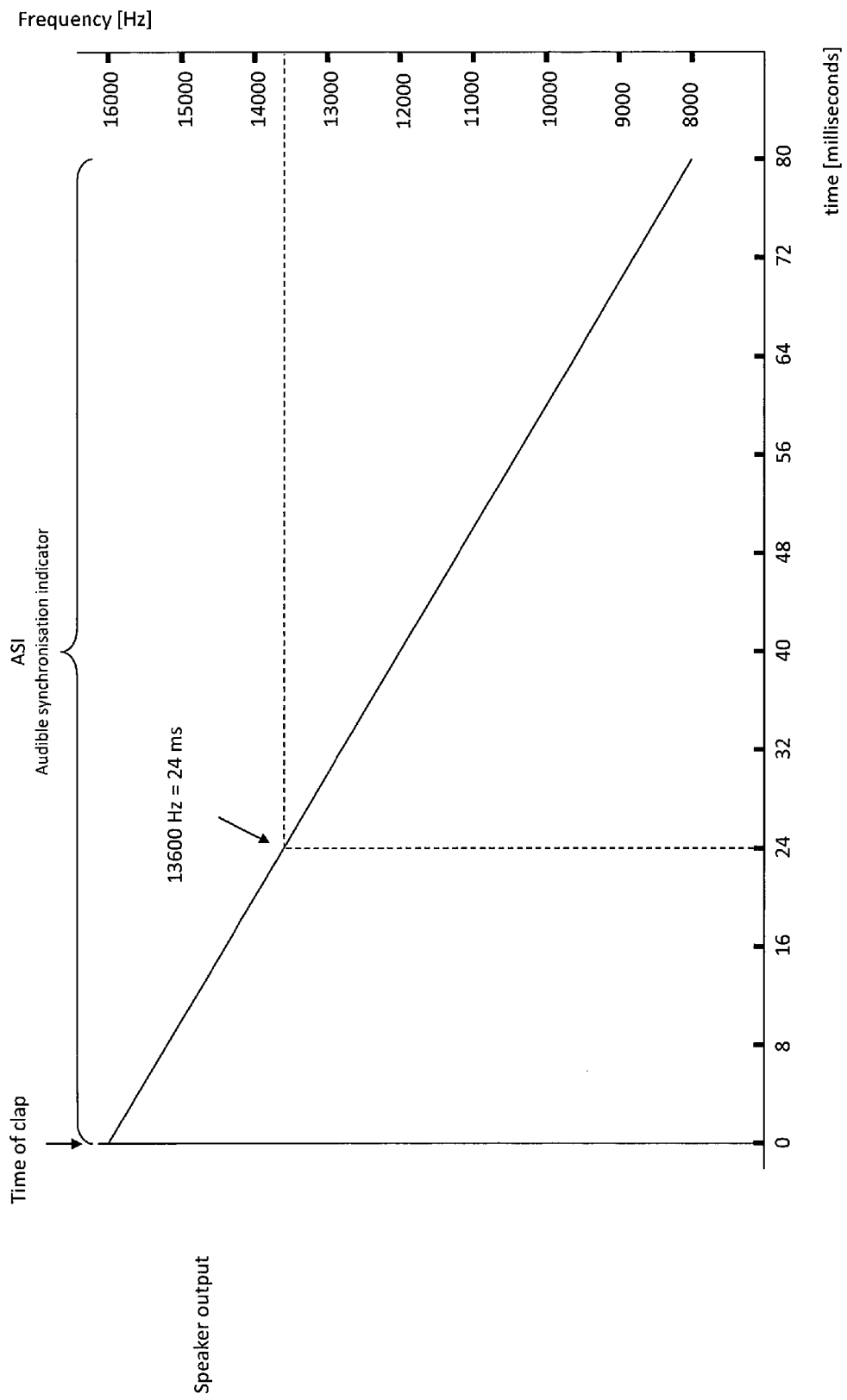
Fig. 11: Audible synchronisation indicator (ASI)

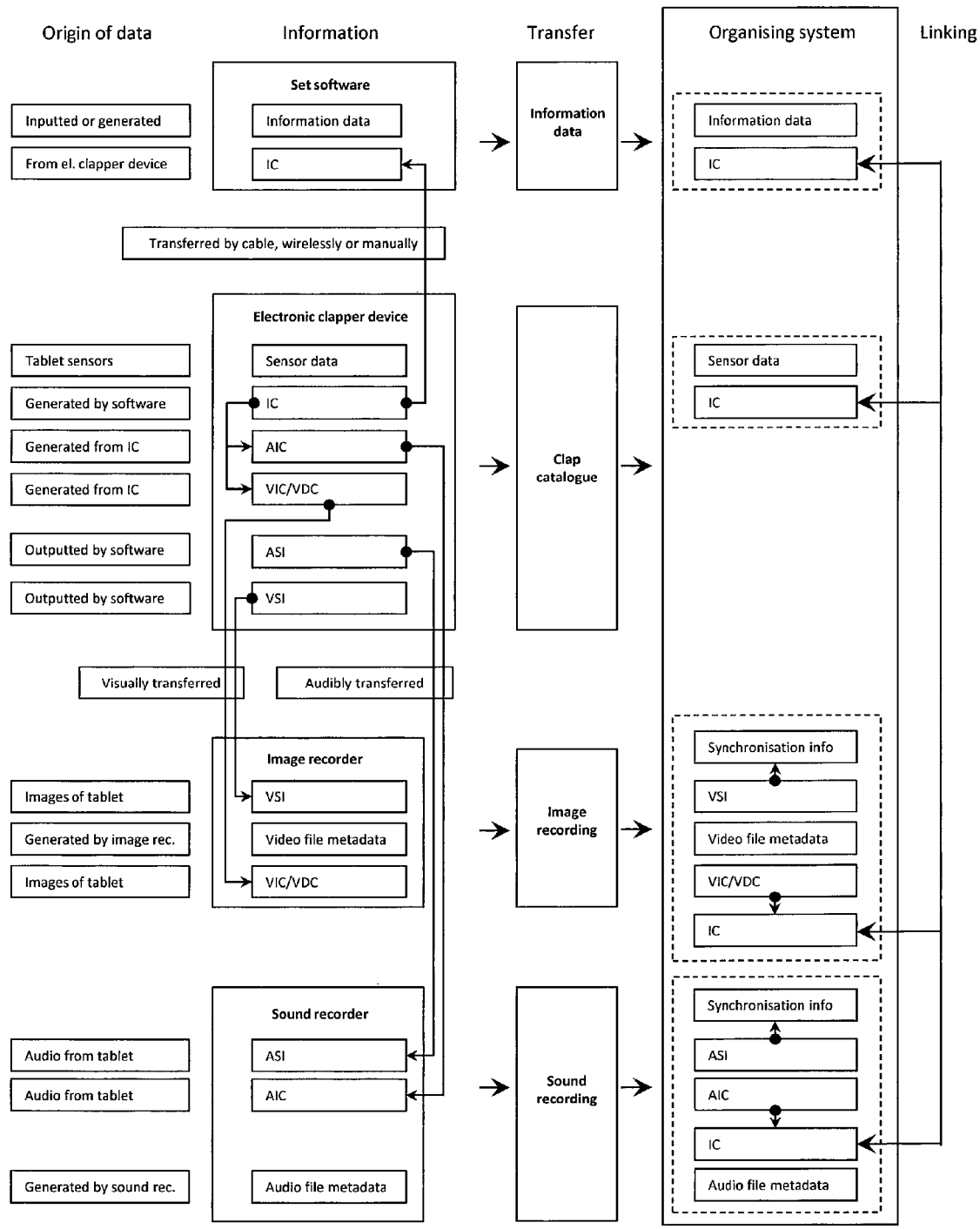
Fig. 12: Data flow chart with clap catalogue

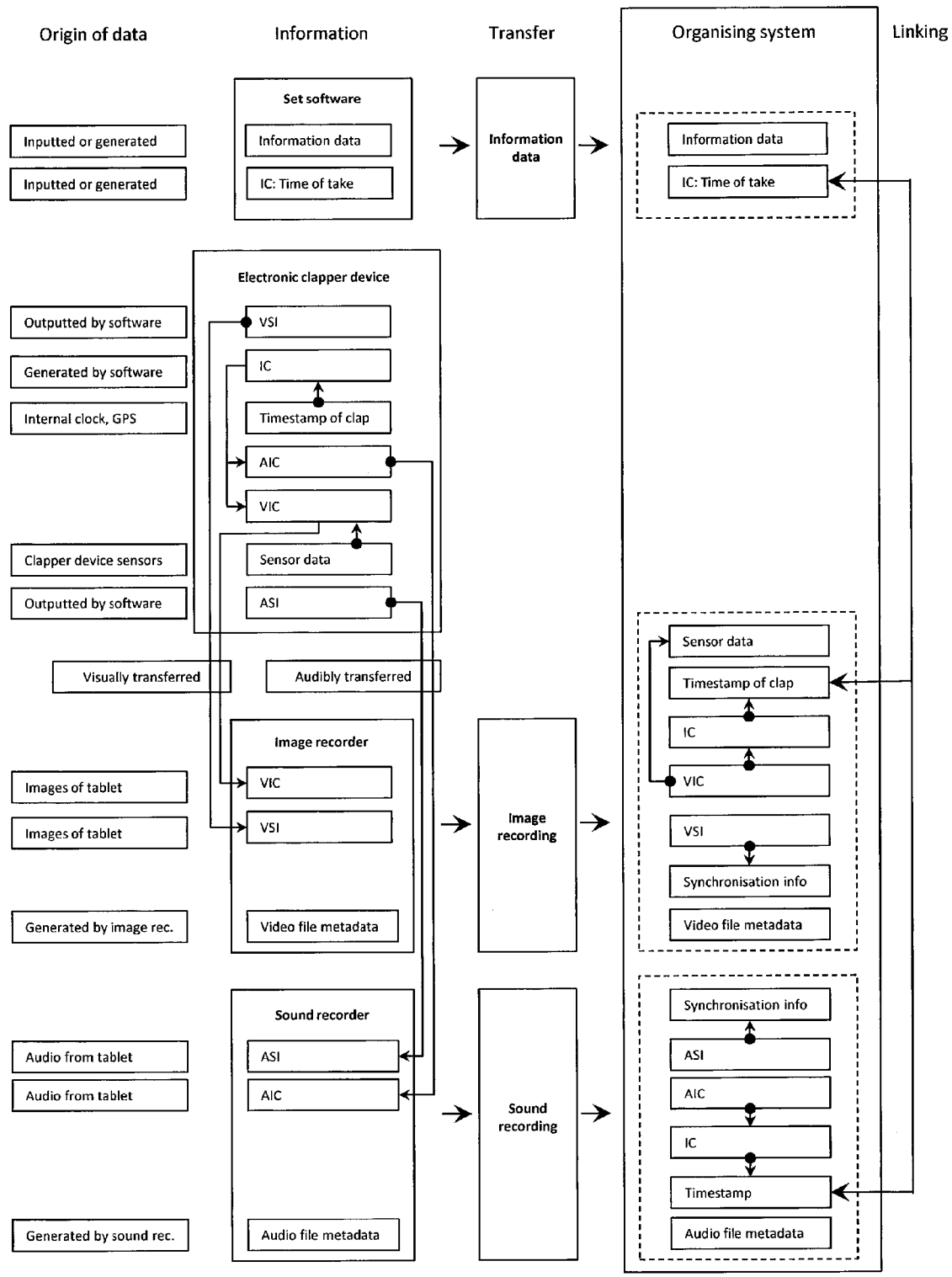
Fig. 13: Data flow chart without clap catalogue

METHOD AND SYSTEM FOR ORGANISING IMAGE RECORDINGS AND SOUND RECORDINGS

FIELD OF THE INVENTION

The present invention relates to a method for organising image recordings recorded by an image recorder and sound recordings recorded by a sound recorder. The present invention also relates to a system for organising image recordings of takes recorded by an image recorder and sound recordings of the takes recorded by a sound recorder.

BACKGROUND OF THE INVENTION

Today large parts of the movie industry utilise digital tools, such as digital video cameras and digital sound recorders. Practically all movie editing is done digitally. Regardless of whether digital equipment is being used, the images and the sound is typically recorded on separate independent media. To obtain a video recording consisting of both images and sound, the image recording and the sound recording must be synchronised in time. This may be achieved by means of a traditional clapperboard during the recording of each take. QRSlate (www.qrslate.com) is a system comprising an electronic clapperboard in the form of a tablet (such as iPhone or iPad from Apple, Android-based tablets etc.) running an application that shows a QR code containing information about the present take. It also shows an image containing a continuously counting digital clock showing time in units of hundredths of seconds. The system also comprises a software program running on a computer for storing the image recordings from the image recorder and which connects information about the scene shown in the QR code to the image recordings. This system, however, does not synchronise image and sound and do not allow for integration of a script log written on a separate computer.

U.S. Pat. No. 6,831,729 shows a system with an electronic clapperboard comprising a tablet running an application which is showing a barcode containing information about the take. It also shows that the electronic clapperboard may receive a time code from a sound recorder. The time code and the barcode that are shown according to the time of shutting the clapperboard are used to synchronise the sound recordings and the image recordings. A software program is described which searches through the image recordings and the sound recordings in order to find the individual pairs of image recordings and sound recordings. Here, the timecode information and machine code displayed, corresponding to the point in time when the clapper is closed, are used to synchronise the auditory and visual elements after digitisation of the same. This method requires the electronic clapperboard and the sound recording device to be connected during recording of the clap, either by cable or by a wireless connection, respectively, limiting the movement of the sound recording person (boomer) and requiring support of the sound recorder.

Alternatively, the image recorder and the sound recorder may run a simultaneous time code that is recorded along with the image and sound onto the respective media. The method requires the camera and the sound recorder are connected to time code generators that are regularly synchronised. Ambient Recording GmbH (http://www.ambient.de/en.html) is a company selling such time code generators. An application for a tablet for the purpose of generating and showing time codes is also shown. Image recorders and film recorders having these features are expensive and are used by professional film production companies only. This requires the time code generator on the camera and the time code generator on the sound recording device to be synchronised regularly via wireless transmitters and receivers, which is power consuming, or via cable, which is time consuming. This system requires that camera, sound recorder and the editing software support time code synchronisation. It does not integrate the script log in the editing software.

MovieSlate (http://www.movie-slate.com) shows a system with an electronic clapperboard similar to the QR slate above. Here it is stated that if sound should be synchronised with the images, a separate unit called "The Timecode_Buddy" must be used. This unit (http://www.movie-slate.com/Timecode_Buddy) must be connected by a wire or via a wireless interface to the clapperboard. MovieSlate is also described in U.S. Pat. No. 4,646,167.

The workflow on a film set by using prior art technology is briefly illustrated in FIG. 1. The sound recorder produces sound recordings and the image recorder produces image recordings. During the recording period, a script log, containing notes and information about each take, is written by the script supervisor. These notes are used e.g. to ensure the continuity of the action in the scenes.

The script log can be organised with dedicated software such as Script-e (http://www.scriptesystems.com), but often ordinary text editing tools such as Microsoft Word, Excel or writing by hand are used by the script supervisor.

From this point, the digital image technician takes care of the sound and image recordings. The image recordings are transcoded and files are backed up. These unedited recordings are denoted dailies or rushes and comprise the raw image recordings together with the respective sound recording.

Before the editing period, all the image recordings and the sound recordings must be organised before they are imported into the editing tool. Here, the matching pairs of sound recordings and image recordings from the same take must be found, and the pairs of image recordings and sound recordings must be synchronised. Moreover, information about the takes (title, location, number etc.), the information from the script log etc. must be added into the editing software in order to simplify the editing process. Often, such information is inputted manually. This information is from here on denoted "organising information". In the film industry today, a person denoted "logger" will use weeks to organise the recordings and corresponding information before the editing process can start for a typical full length movie. During the editing the editor put the most suitable takes together to form a motion picture, a broadcasting series or television program etc.

The object of the invention is to provide a method and system that simplifies and increases the efficiency of the process of organising image recordings and sound recordings before they are ready for the editing process. Hence, the object of the invention is to provide a method and system which reduces the effort of finding the pairs of image recordings and sound recordings of the same takes, and the object is to provide a method and system which reduces the effort of synchronisation of these pairs of image and sound recordings.

In addition, the object is to provide a method and system where information from the script log etc. may be added in a simple way.

SUMMARY OF THE INVENTION

The present invention relates to a method for organising image recordings of takes recorded by an image recorder and sound recordings of the takes recorded by a sound recorder, where the image recordings each comprises a visual information code, and where the sound recordings each comprises an audible information code, where the method comprises the steps of:

searching through the digital image recordings for the visual information codes and decoding them to acquire an identification code;

searching through the digital sound recordings for the audible information codes and decoding them to acquire the identification code;

organising sets of image recordings and sound recordings based on their identification codes.

In one aspect the visual information code comprises a unique computer readable symbol.

In one aspect the visual information code is provided into the image recordings by the step of:

outputting the visual information code on a display of an electronic clapper device to the image recorder during the recording of each take.

In one aspect the audible information code comprises a unique computer readable sound signal.

In one aspect the audible information code are provided into the sound recordings by the step of:

outputting the audible information code by means of a speaker of an electronic clapper device to the sound recorder during the recording of each take.

In one aspect the method further comprises the step of:

outputting the visual information code and the audible information code in a predetermined way.

In one aspect the image recordings each also comprises a visual synchronisation indicator, and where the sound recordings each also comprises an audible synchronisation indicator, where the method comprises the steps of:

searching through the image recordings for the visual synchronisation indicators;

searching through the sound recordings for the audible synchronisation indicators;

synchronising the sets of image recordings and sound recordings based on synchronisation information respectively from the visual synchronisation indicators and the audible synchronisation indicators.

In one aspect visual synchronisation indicator is provided into the image recordings by the step of:

outputting the visual synchronisation indicator on the display of the electronic clapper device to the image recorder during the recording of each take.

In one aspect the step of outputting the visual synchronisation indicator comprises:

changing the appearance of the visual information code.

In one aspect the step of outputting the visual synchronisation indicator comprises:

changing a synchronisation indicator.

In one aspect the audible synchronisation indicator is provided into the sound recordings by the step of:

outputting the audible synchronisation indicator by means of a speaker of an electronic clapper device to the sound recorder during the recording of each take.

In one aspect the step of outputting the audible synchronisation indicator comprises:

outputting a sound signal after, during, before or as part of the audible information code.

In one aspect the image recordings each comprises a visual information code comprising a reference to information data containing information about the present recording stored in an information data file, where the method comprises the step of:

searching through each image recording for the respective visual information code;

searching through the information data file for the visual information code;

storing the information data about the present recording from the information data file for the synchronised sets of image recordings and sound recordings.

In one aspect the electronic clapper device is a tablet.

The present invention also relates to a system for organising image recordings of takes recorded by an image recorder and sound recordings of the takes recorded by a sound recorder, where the system is configured to perform the method described above.

DETAILED DESCRIPTION

Embodiments of the invention will now be described in detail with reference to the enclosed drawings, where:

FIG. 11 illustrates the audible synchronisation indicator ASI output from the speaker on the electronic clapper device;

FIG. 12 illustrates the data flow with use of the organising system, where a clap catalogue is transferred from the electronic clapper device to the organising system and where an identification code IC is transferred to the script software on the set;

FIG. 13 illustrates the data flow with use of the organising system, without transfer of a clap catalogue from the electronic clapper device to the organising system and without transfer of an identification code to the script software on set.

FIRST EMBODIMENT

Figure 1:
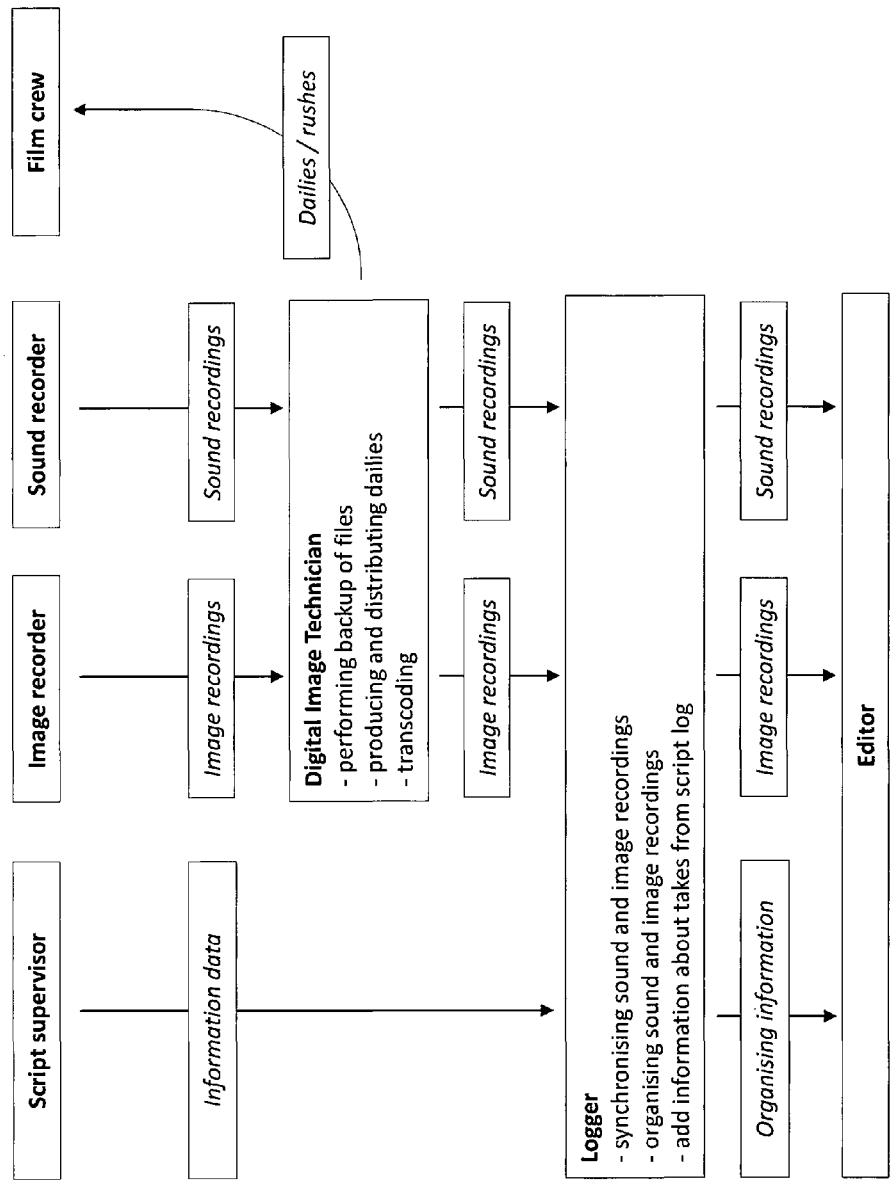
FIG. 1 illustrates the prior art workflow of organising image recordings, sound recordings and information data and preparing them for the editing process.

A method for organising image recordings 10 and sound recordings 12 will now be described with reference to FIG. 2.

On the set, image recorders provide image recordings of the take, while sound recorders provides sound recordings of the take.

A digital image recording is a sequence of digital still images, recorded consecutively, typically at a rate of 24 to 30 still images per second. The images can be played back at the recorded rate to appear continuous in time. A digital image recording originates from an image recorder. An image recorder is either digital, i.e. it provides the image recording directly in a digital format, or analogue, in which case the still images must be converted to a digital format to form a digital image recording.

A digital sound recording is a sequence of sound samples, recorded consecutively, typically at a rate of 44000 to 96000 samples per second. The samples can be played back through a loudspeaker to appear to recreate the recorded sound. A digital sound recording originates from a sound recorder, either digital, i.e. it provides the sound recording in a digital format directly or analogue, in which case the sound recording must be converted to a digital format to form a digital sound recording.

A take is one or more continuous image recordings and/or one or more continuous sound recordings, overlapping in time and recorded in an attempt to record the same situation.

The data of a take is the image recordings and the sound recordings that make up the take. All other information produced when recording a take is denoted "metadata". Examples of metadata include, but are not limited to, the time of the take, generated technical information e.g. concerning lens types, camera configuration etc. and manually inputted information. This can be stored on any medium and in any format, also as part of the data files that store the sound and image recordings.

Each image recording and each sound recording comprises one or more identification codes IC. An identification code IC identifies a unique electronic clap. Examples of data that may act as an identification code IC include a random code, the timestamp of the electronic clap, the place of the recording of the take, the name of the take etc. The term "electronic clap" is defined below, but typically relates to a unique take. Several identification codes IC may relate to a single electronic clap. Any code that can be mapped to a unique electronic clap may act as an identification code IC. This includes a point in time during or close to a take that can be linked to an electronic clap by being the closest registered point in time. Thus, for a given electronic clap, the sound and image recordings may encode different identification codes IC, as long as they refer to the same electronic clap. How these codes may be added to the sound and image recordings will be described below.

A visual information code VIC is a visual encoding of an identification code IC that is computer readable, i.e. it may be recognised by computer software, for example by utilizing image recognition algorithms. The visual information code VIC may also encode additional information such as the timestamp of the electronic clap or manually inputted information. The unique computer readable code may be a code in time or space, i.e. it may be symbol like a barcode, or it may be a code in time over several frames of the image recording e.g. a Morse code.

An audible information code AIC is an audible encoding of an identification code IC that is computer readable, i.e. it may be recognised by computer software, for example by utilising sound recognition algorithms. The audible information code AIC may also encode other information such as the timestamp of the electronic clap or manually inputted information. Computer readability may be achieved by applying a sound signal with some predetermined pattern (e.g. predetermined amplitude pattern and/or frequency pattern, predetermined length etc.). This unique computer readable sound signal may be a DTMF signal.

The clap of a clapperboard consists of a visual element with the purpose of being recorded on all image recordings of a take and an audible element with the purpose of being recorded on all sound recordings of a take. In this document we define an "electronic clap" as a pair consisting of a visual information code VIC and an audible information code AIC relatable through their encoded identification codes IC to the same electronic clap. Thus, the information needed to automatically organise the recordings, with respect to the electronic clap, is stored as part of the recording data and no metadata needs to be stored separately, often referred to as in-band. The electronic clap lasts until all the audible codes and the visual codes are finished being outputted by the electronic clapper device.

Figure 2:
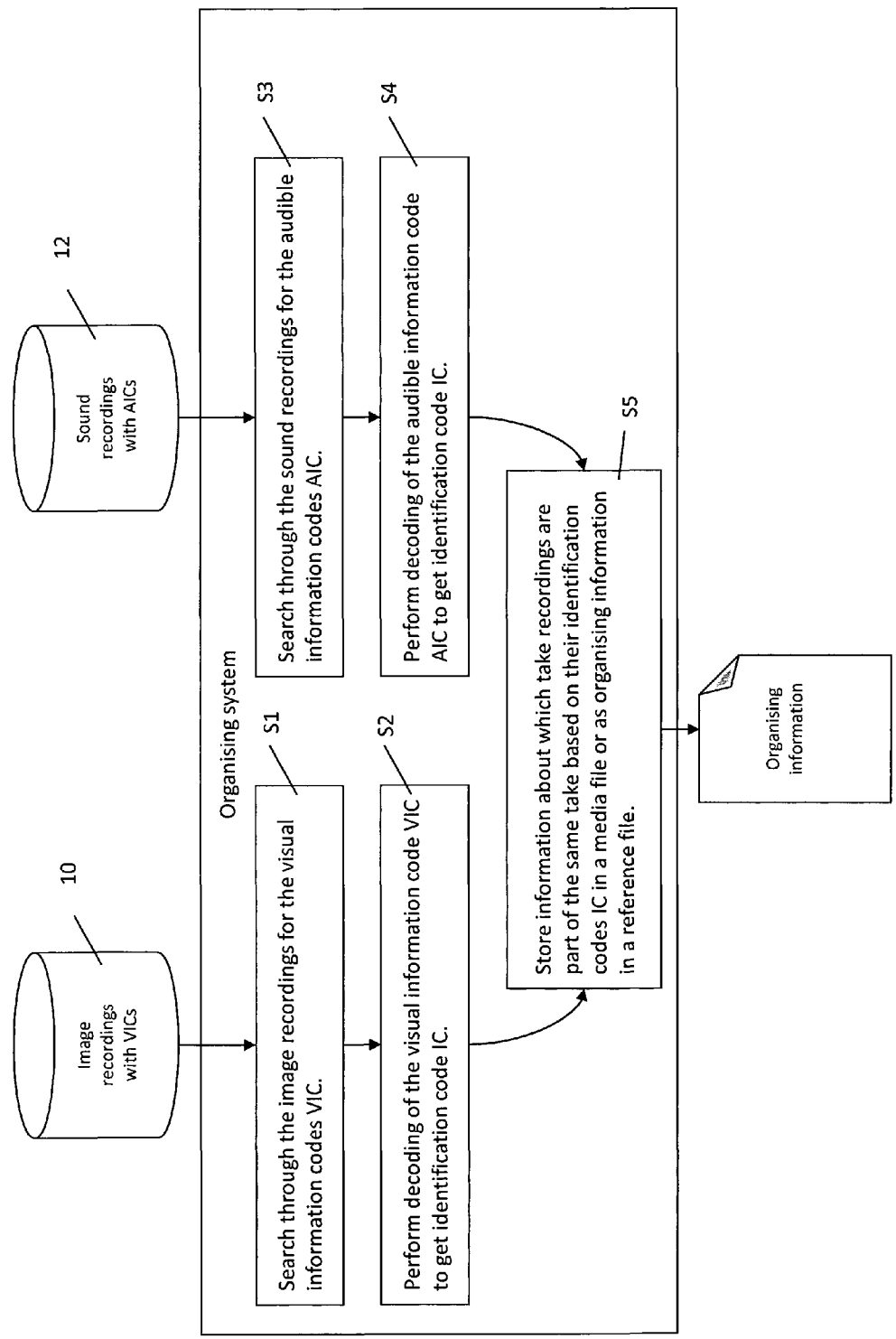
FIG. 2 illustrates a first embodiment of the method according to the invention.

In FIG. 2, in a first step S1, the method is performing a search through the image recordings for the visual information codes VIC. In a second step S2, the method is decoding the visual information code VIC to obtain the corresponding identification code IC. In a third step S3, the method is performing a search through the sound recordings for the audible information codes AIC. In a fourth step S4, the method is decoding the audible information code AIC to obtain the corresponding identification code IC.

In a fifth step S5, the method is performing an organisation of sets of image recordings and sound recordings by storing information about which take recordings are a part of based on their identification codes IC. The storing may be performed by saving information as organising information in a reference file. The organising information allows the organisation to be reproduced without performing steps S1-S5.

The organising information may be stored e.g. in a database, by adding references to their file names in a computer file e.g. formatted as xml or mxf, adding a name or code to the files metadata or by changing their file names so that at least parts of their names are equal. For example, the file name of an image recording may be "scene_32_take_2.hdv" and the corresponding file name of a sound recording may be "scene_32_take_2.aiff".

Most often the claps are located early or late in each recording. Searching the places in the video files and sound files where the electronic clap is most likely to be found first, increases the probability that the electronic clap will be found early in the scanning of the files, thus reducing the time and computing power needed to process the files.

The present invention is also comprising an organising system 100, or a system for organising image recordings of takes recorded by an image recorder and sound recordings of the takes recorded by a sound recorder, where the system is configured to perform the method according to one of the embodiments. The system 100 will be described further in detail below.

Second Embodiment

Referring to FIG. 3, FIG. 4, FIG. 6*a*, FIG. 6*b* and FIG. 10, a method for encoding the visual information code VIC and the audible information code AIC into an image recording and a sound recording respectively is described. Hence, the second embodiment describes initial steps of the method of the first embodiment.

Figure 3:
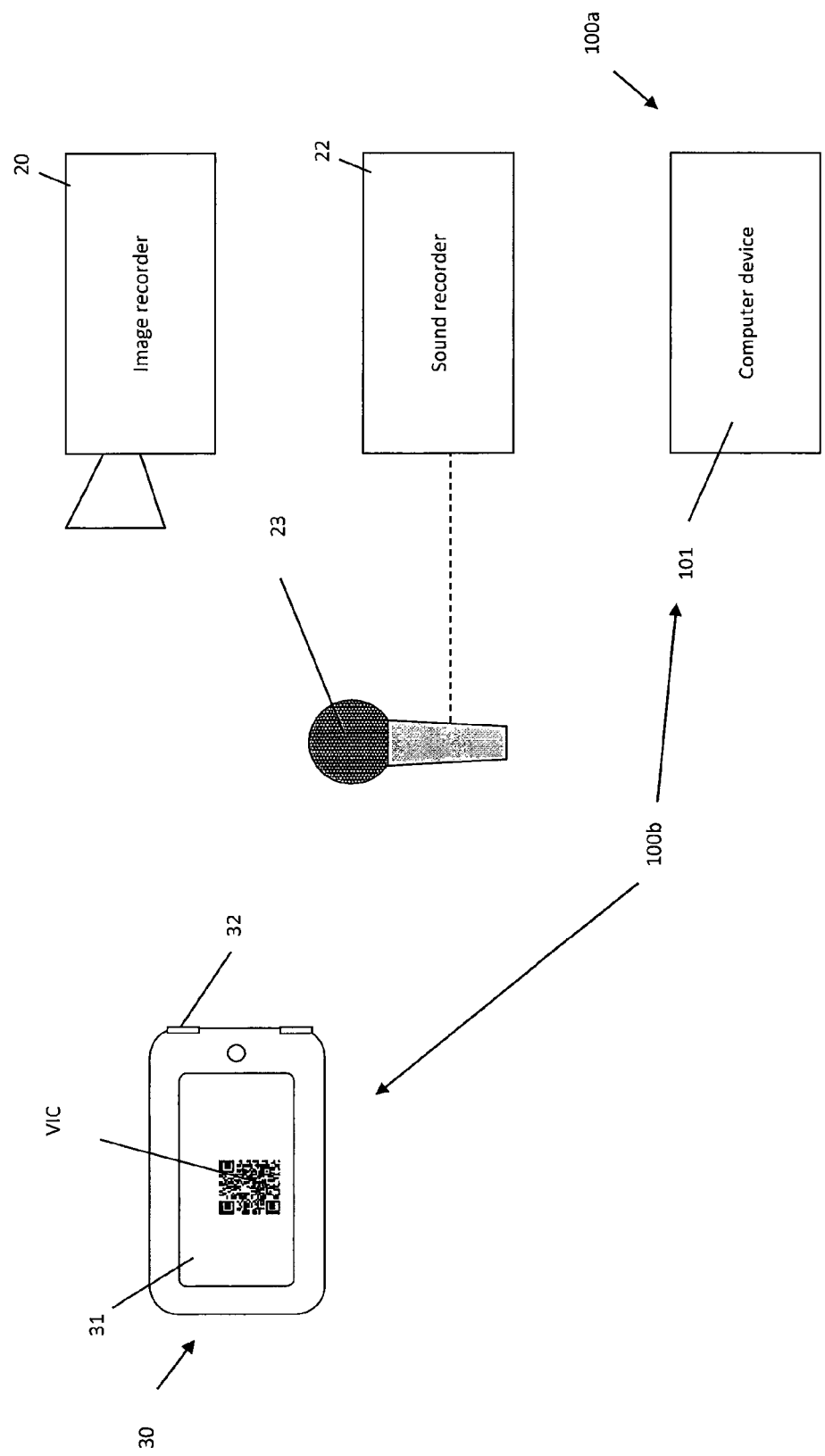
FIG. 3 illustrates the electronic clapper device used during the recording of the image recording and the sound recording.
Figure 4:
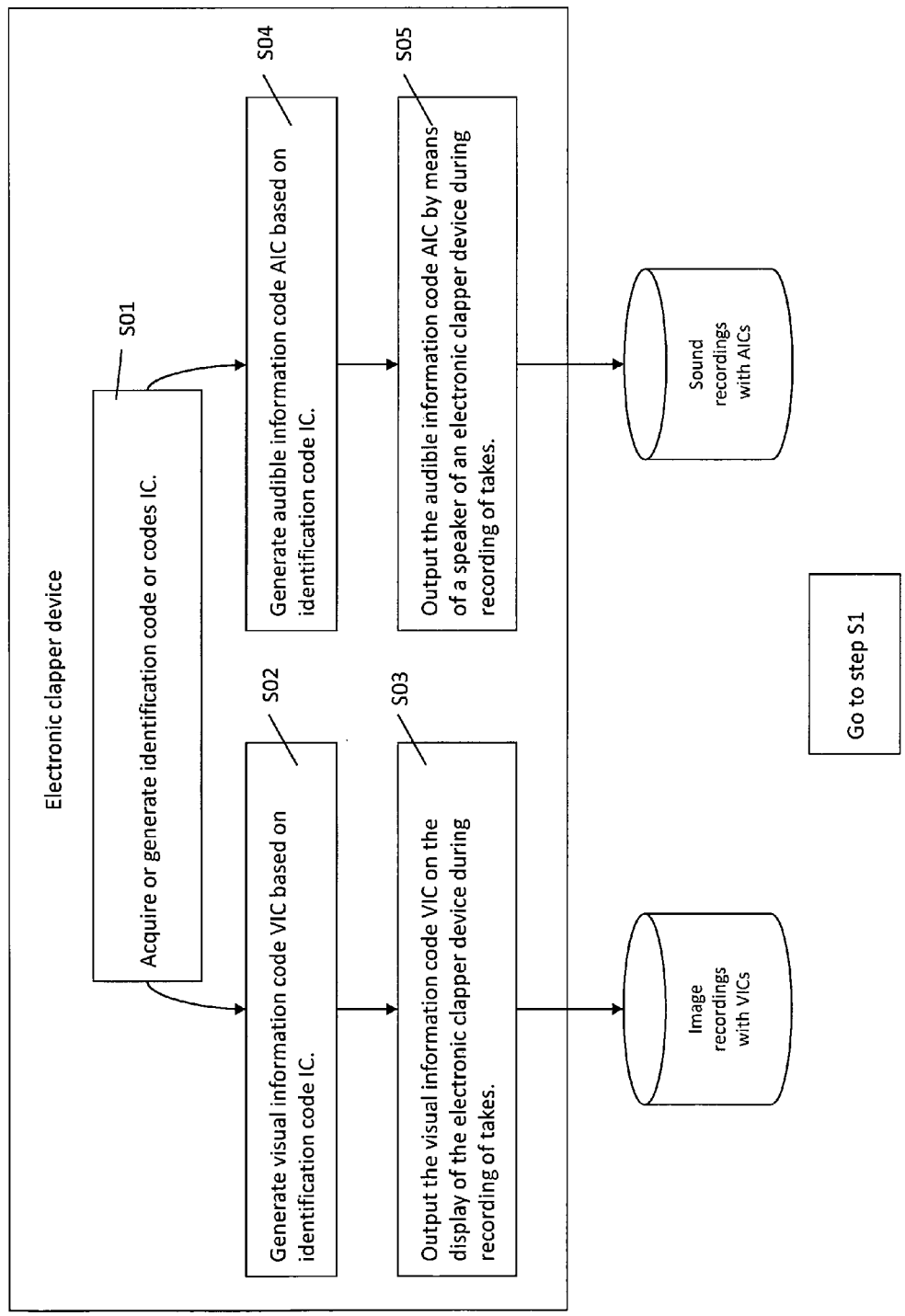
FIG. 4 illustrates a second embodiment of the method according to the invention.

FIG. 3 illustrates a typical film set, where an image recorder 20 is recording an image recording, and where a sound recorder 22 is recording a sound recording, that together constitutes a take.

Figure 10:
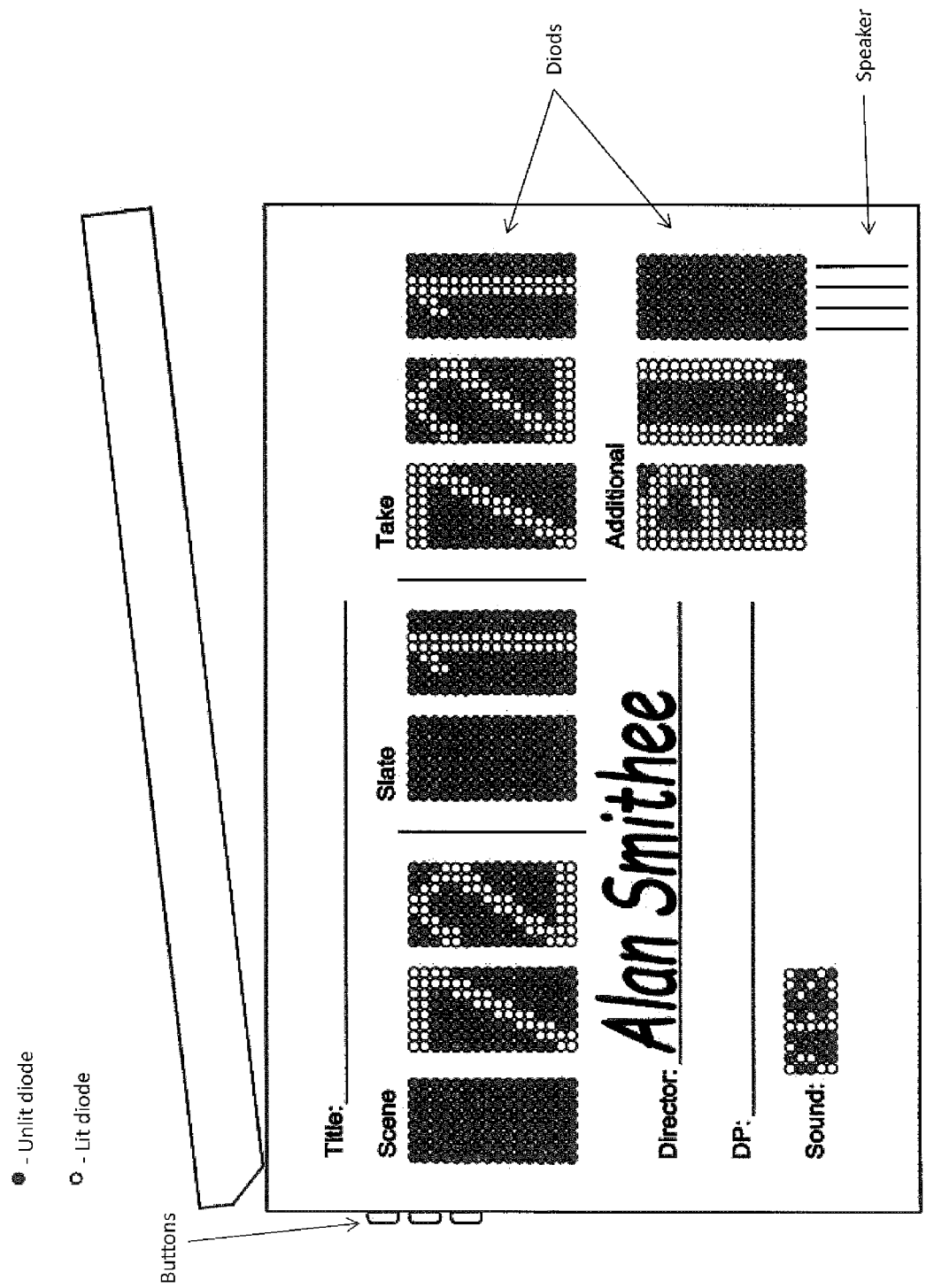
FIG. 10 illustrates an alternative embodiment of an electronic clapper device where the display is not a screen.

An electronic clapper device 30 comprises a display 31 and at least one speaker 32. The display may consist of diodes as shown in FIG. 10. In a preferred embodiment, the electronic clapper device 30 is a tablet computer, such as an iOS-based tablet (iPad), an Android-based tablet (such as Samsung Galaxy Tab etc.), or a Windows-based tablet. Alternatively, the electronic clapper device may be a smart phone, such as an iOS-based smart phone (iPhone), an Android-based smart phone or a Windows-based smart phone. Alternatively, any other computer device with a display and a speaker capable of outputting a visual information code VIC and an audible information code AIC may be used. The electronic clapper device may be integrated as a part of the image recorder or the sound recorder.

Figures 6A, 6B:
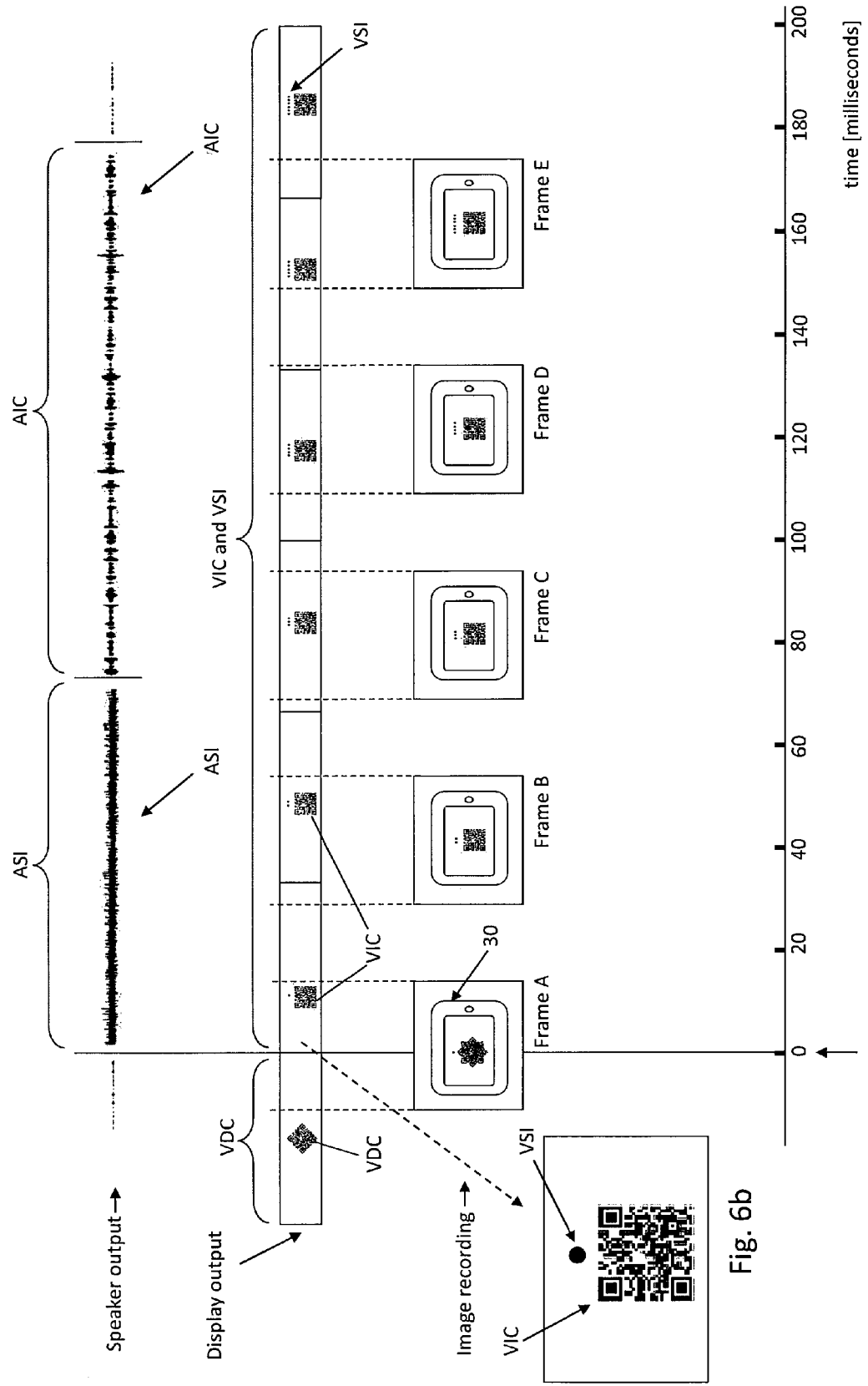
FIG. 6a illustrates a timeline with information about a from the electronic clapper device and how this clap is recorded over five frames in an image recorder.
FIG. 6b is an enlarged view of the visual information code VIC and the visual synchronisation indicator VSI.

Software is installed on the electronic clapper device 30. This software performs the steps of generating and displaying a visual information code VIC, which is recorded by the image recorder 20. In FIGS. 6a and 6b a visual information code VIC, realised in the form of a 2 dimensional barcode is shown. The software also generates and outputs an audible information code AIC which is recorded by the sound recorder 22. This identification code IC is encoded as an audible information code AIC in the form of a sound signal which is outputted via the speakers 32. Hence, an activation of the electronic clapper device 30 provides an electronic clap.

It should be noted that in FIG. 3, the sound recorder and the image recorder are not connected to each other or connected to the electronic clapper device.

Hence, the identification code IC is provided into the image recordings and sound recording by the step S01 (FIG. 4) by acquiring or generating an identification code or codes IC that identifies the forthcoming electronic clap of step S03 and S05. Then performing step S02, generating a visual information code VIC based on an identification code IC from step S01, step S03 outputting the visual information code VIC on the display 31 of an electronic clapper device 30 to the image recorder 20 during the recording of the image recordings of the takes and also step S04 generating an audible information code AIC based on an identification code IC from step S01, step S05 outputting the audible information code AIC by means of the speaker 32 of the electronic clapper device 30 to the sound recorder 22 during the recording of the sound recordings of the takes. These steps are performed before step S1 above.

Thrid Embodiment

Figure 5:
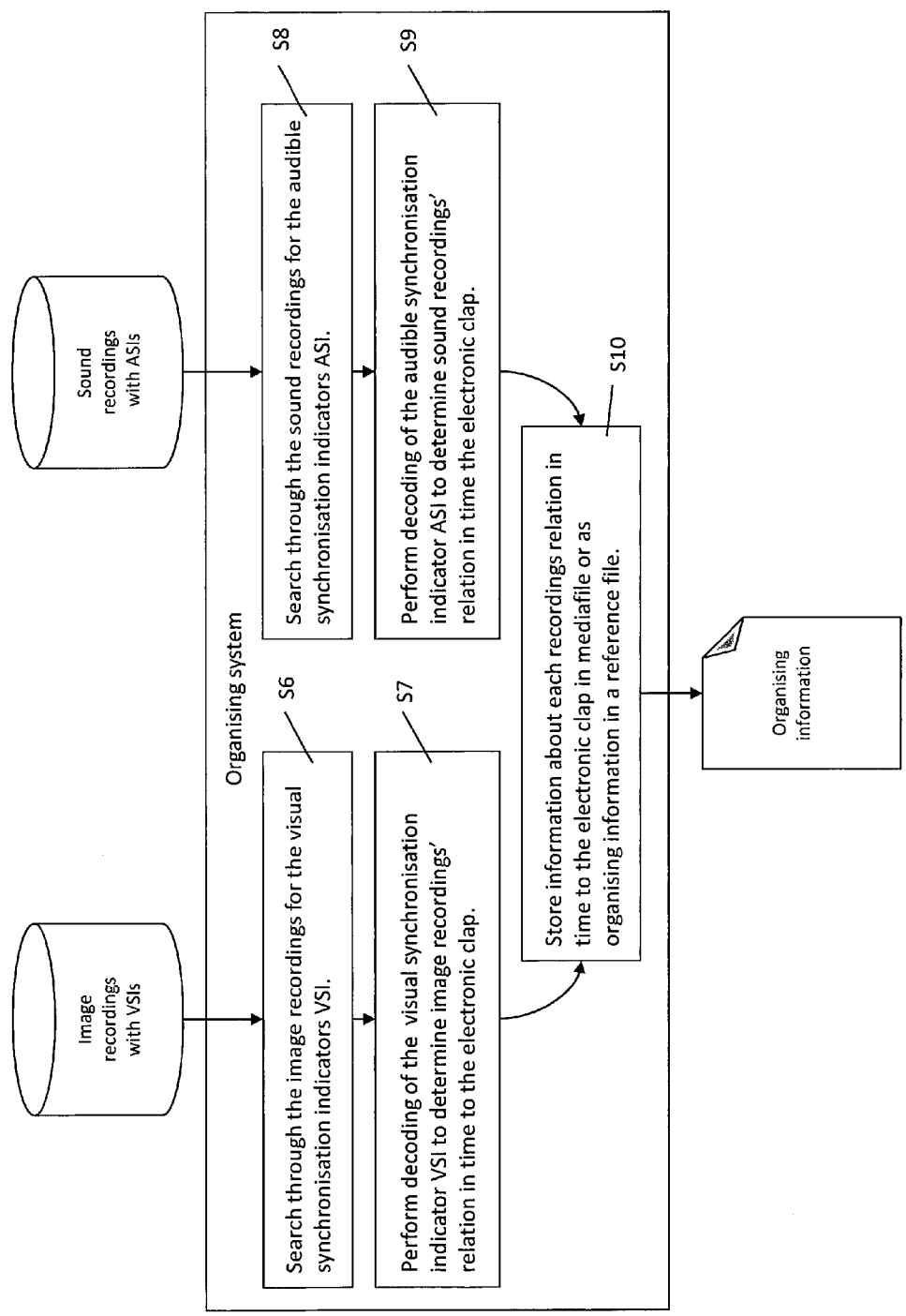
FIG. 5 illustrates a third embodiment of the method according to the invention.

Referring to FIG. 5 this third embodiment describes a method for automatic synchronisation of digital image and sound recordings, which is also a part of the process of organising image and sound recordings. The method comprises all the steps of the first embodiment above. Preferably, the method comprises the steps of the second embodiment as well. Compared with the second embodiment, the electronic clap is extended with visual and audible synchronisation information. Synchronisation information is information data added to the image recordings and sound recordings that constitute a take that allows the recordings to be synchronised in time. Information data is described further below. Two or more recordings are said to be synchronised when they can be played back such that any recorded event occur simultaneously in all the recordings.

In FIG. 6a, it is shown that the step of outputting visual synchronisation information may comprise changing the appearance of the visual information code VIC. As described above, the visual information code VIC may be a barcode. In FIG. 6a, it is shown that before the electronic clap, a visual detection code VDC different from the visual information code VIC is displayed on the display 31 of the electronic clapper device 30. The visual detection code VDC may also be a barcode and encode some of the same information as the visual information code VIC e.g. the identification code IC. However, because the visual detection code VDC is shown before the electronic clap has occurred information such as the timestamp of the clap is not available to encode into the visual detection code VDC.

The audible information code AIC may implicitly contain synchronisation information, thus constituting a synchronisation indicator itself, e.g. by using the time of the start of the signal. Synchronisation information may also be added to the visual information code VIC by changing its appearance or recognising where the code begins. However a visual synchronisation indicator VSI and an audible synchronisation indicator ASI may be added to add more accurate and robust synchronisation information. The sole purpose of the visual synchronisation indicator VSI and the audible synchronisation indicator ASI is to encode synchronisation information with high robustness and precision in time, no other data is encoded.

In step S6, the method is performing a search through the image recordings for the visual synchronisation indicators VSI. This search may be assisted by the use of the visual information codes VIC as described below. In step S7 the method is performing a decoding of the visual synchronisation indicator VSI to determine the image recordings' relation in time to the electronic clap. This information implicitly contains information about how all the recordings that have recorded the same electronic clap are related in time.

In step S8, the method is performing a search through the sound recordings for the audible synchronisation indicators ASI, possibly assisted by the audible information codes AIC, as described below. In step S9 the method is performing a decoding of the audible synchronisation indicator ASI to determine the sound recordings' relation in time to the electronic clap. This information implicitly contains information about how all the recordings that have recorded the same electronic clap are related in time.

In step S10, the method is performing the step of synchronising the sets of image recordings and sound recordings based on their respective visual synchronisation indicators VSI and their respective audible synchronisation indicators ASI. When the recordings are synchronised, i.e. their relation in time is known, the system may create new files containing synchronised video and audio or it may save the organising information to separate files.

Step S6, S7 and S10 should be performed in that order and the steps S8, S9 and S10 should be performed in that order, however, step S6, S7 and S10 don't necessarily need to be performed at the same time as step S8, S9 and S10.

Depending on the way the synchronisation indicators are implemented, steps S6, S7 and S10, and the steps S8, S9 and S10 may be performed before, after or simultaneously with the steps S1 and S3. However, in some implementations the localisation of the visual synchronisation indicator VSI is based on the localisation of the visual information code VIC in which case step 51 must be performed before step S6. Correspondingly, in some implementations the localisation in time of the audible synchronisation indicator ASI is dependent on the localisation in time of the audible information code AIC, in which case step S3 must be performed before step S8.

The visual synchronisation indicator VSI and the audible synchronisation indicator ASI are preferably also provided into the image recording and the sound recording by means of the electronic clapper device 30. Hence, the visual synchronisation indicator VSI is provided into the image recordings by the step of outputting the visual synchronisation indicator VSI on the display of the electronic clapper device to the image recorder during the recording of the takes. Moreover, the audible synchronisation indicator ASI is provided into the sound recordings by the step of outputting the audible synchronisation indicator ASI by means of the speaker of the electronic clapper device to the sound recorder during the recording of the takes.

FIGS. 6a and 6b shows an example where the visual synchronisation indicators VSI are designed in a way that allows time localisation with a precision that exceeds the frame rate of the image recording. A time line is shown illustrating a time period of 200 ms, in which an electronic clap is generated and outputted by the electronic clapper device 30. In the upper part of the time line, the speaker output of the electronic clapper device, i.e. the sound signal comprising the audible information code AIC and the audible synchronisation indicator ASI is illustrated. Below the speaker output, the display output of the electronic clapper device is illustrated. As shown, the speaker output and the display output are synchronised since they are generated and outputted by the same device. For synchronisation to be possible the visual synchronisation code VSI and the audible synchronisation code ASI don't necessarily need to occur at the same time, but their relation in time must be known by the organising system e.g. by being predetermined or stored.

The time of the clap is also indicated. The purpose of a clap of an ordinary clapperboard is to serve as a common point in time for both the sound recording and the image recording. The electronic clap, however, may have a longer extension in time and the synchronisation indicators of the image and the sound don't necessarily need to be recorded at exactly the same time. The electronic clap lasts until all the audible codes and the visual codes are finished being outputted by the electronic clapper device 30.

Below the display output, the image frames recorded by the image recorder are illustrated. Here the image recorder is recording 25 frames per second, with a shutter time of 1/40 s giving a small period between each frame in which no image is recorded. As shown, the image recorder is recording the display of the electronic clapper device. The screen of the electronic clapper device is shown to refresh the whole screen 30 times pr second. It is here assumed that an exposure time of at least 4 milliseconds is necessary to record a machine readable exposure of a synchronisation indicator. In frame A the first synchronisation indicator is registered, indicating that the visual synchronisation indicator VSI is initiated during the exposure of this frame. This gives synchronisation information with an accuracy of 1/25 of a second, that is, 40 milliseconds. The next frames, B and C, carries no more synchronisation information. Frame D will have 1 ms exposure of the $5^{th}$ synchronisation indicator, to short for it to be machine readable. Frame E will get exposure of the $6^{th}$ synchronisation indicator during the last 8 ms of the shutter opening. If the visual synchronisation indicator had been initiated 3 milliseconds earlier the $5^{th}$ synchronisation indicator would have been recorded in frame D. Had the clap occurred 5 or more milliseconds later the $6^{th}$ synchronisation indicator would not have been recorded during the frame E. Hence, the jump from 4 machine readable synchronisation indicators in frame D to 6 in frame E together with knowledge of the visual synchronisation indicator VSI starting 4 frames earlier gives the location in time of the electronic clap with a precision better than 10 milliseconds.

More frames of an image recording of an electronic clap may be analysed to achieve an even higher accuracy of synchronisation. The codes are here shown to last only 200 ms in total. Accuracy and robustness may be increased by extending the period of time the electronic clap is shown. A longer audible information code AIC may also be used to encode more information into this signal.

It should be noted that the sound recording recorded by the sound recorder is not shown. It is assumed that the sound recording is identical to the speaker output and that the delay can be ignored here due to a small distance between the electronic clapper device and the microphone of the sound recorder, as it is when using an ordinary clapperboard.

Further it should be noted that whether the tablet screen of the electronic clapper device is interlaced or progressive or whether the digital image recording is interlaced or progressive, in this embodiment of the invention, only makes minor differences to how the software read the visual codes.

Often the electronic clapper device will be held in front of the camera for a short time before the electronic clap is set off. The visual detection code VDC makes use of this time period. If the identification code IC is encoded into the visual detection code VDC the probability of successful detection and decoding of the identification code IC will be greater, thus the detection of the electronic clap is more robust. This requires that an identification code IC is encoded into the visual detection code VDC. At the time of clap, the display of the electronic clapper device changes its output to show the visual information code VIC. As shown in FIG. 6a the display output is changing fast, so that both the visual detection code VDC and the visual information code VIC is exposed and recorded in Frame A of the image recording. When a physical clapper stick is used to set off the electronic clap, the screen may be blurry for a while due to the shaking of the physical clap. This adds to the necessity of the visual detection code VDC. The change in visual appearance between the codes may be used for synchronisation.

In order to improve the accuracy and robustness of the synchronisation, the step of outputting the visual synchronisation indicator VSI may comprise changing a synchronisation indicator. It should be noted that the visual synchronisation indicator VSI may be used together with the above synchronisation method, or it may replace the above synchronisation method.

Here, the visual synchronisation indicator VSI comprises a series of dots, where the number of dots are increasing every time the display of the electronic clapper device is refreshed at 30 times pr second. Thus the synchronisation indicator changes every 33.3 ms from one dot at the time of the clap up to for example six dots. In this way, it is ensured that, in this example, at least five frames (Frame A to Frame E) comprise the visual synchronisation indicator VSI.

It will be advantageous to use an indicator that is not required to be in perfect focus to be read by the software. Examples of such an indicator include a changing colour or greyscale.

To overcome possible problems with reflections interfering the reading of the code, one might use a larger part of the display for the visual synchronisation indicator VSI. This will in particular be the case when a matte box is used to shield the tablet screen from sunlight, as the sunlight might leave a clearly delineated area of the screen unreadable. This does not to the same extent apply to the visual information code VIC and visual detection code VDC as they appear on the screen for a longer time and the film crew will have time to ensure that they are visible by the camera, as they would with a normal clapperboard.

The software may use the location of the visual information code VIC to determine the location of the visual synchronisation indicator VSI. In order to be able to read the visual synchronisation code VSI, even from frames where the location of the visual detection code VDC or the visual information code VIC is unreadable, one might perform tracking of the visual synchronisation indicator VSI from a point where the visual detection code VDC or the visual information code VIC is readable.

The location in time of the audible synchronisation indicator ASI must be determinable when the audible information code AIC is known, i.e. either the relation in time between the audible information code AIC and the audible synchronisation indicator ASI is fixed, or the location is encoded into the audible information code AIC. Also the location in space of the visual synchronisation indicator VSI must be determinable when the visual information code VIC is known The step of outputting the audible synchronisation indicator ASI and the step of outputting the audible information code AIC comprise outputting sound signals. In FIG. 6a, there is no speaker output before and after the electronic clap. The synchronisation information may be encoded by outputting a predetermined sound signal, non-repeating in the sense that any part of it determines the relative location of that part, e.g. a signal consisting of a tone which frequency decreases within a predetermined frequency range as shown in FIG. 11. Here the audible synchronisation indicator ASI is a tone changing gradually in frequency over 80 ms. The audible synchronisation indicator ASI may have any desired length. In the example the frequency is changing from 16 kHz to 8 kHz. Then for every 100 Hz lower than 16 kHz measured, 1 ms will have passed since the beginning of the audible synchronisation indicator ASI. How precisely the synchronisation point can be located, will depend on the sample rate of the recording, the frequency range of the chosen sound signal and the number of tones that make up the signal. However, with standard recording equipment used in the film industry, the location in time of the audible synchronisation indicator ASI can be determined with a precision that exceeds the precision achieved when synchronising using a regular clapperboard. It is possible to do decoding of the audible synchronisation indicator ASI at several places during the progression of the electronic clap. This will increase the robustness.

Letting the tone change for some time and letting the frequency change over a relatively big spectrum of frequencies reduce the chance of external noise happening during the recording disturbing all the read frequencies of the signal.

Thus robustness of the audible synchronisation indicator ASI is enhanced. The audible synchronisation indicator ASI may consist of several frequencies outputted at the same time. The number of frequencies the audible synchronisation indicator ASI consists of will affect how long a sampling is needed to determine the level of the different frequencies.

The audible synchronisation indicator ASI may be repeated several times in a single electronic clap to increase robustness from noise. If it is repeated in exactly the same form it is necessary to keep track on which code is being decoded at any given moment. Preferably different audible synchronisation indicators ASI within a single electronic clap are not alike, making it possible to distinguish them from each other e.g. the frequency could go respectively up and down in two variations of the audible synchronisation indicator ASI. Different audible synchronisation indicators ASI in the same clap would have a different, predetermined location in time to the electronic clap. FIG. 6A illustrates how the audible synchronisation indicator ASI and the audible information code AIC may be outputted.

Fourth Embodiment

Figure 7:
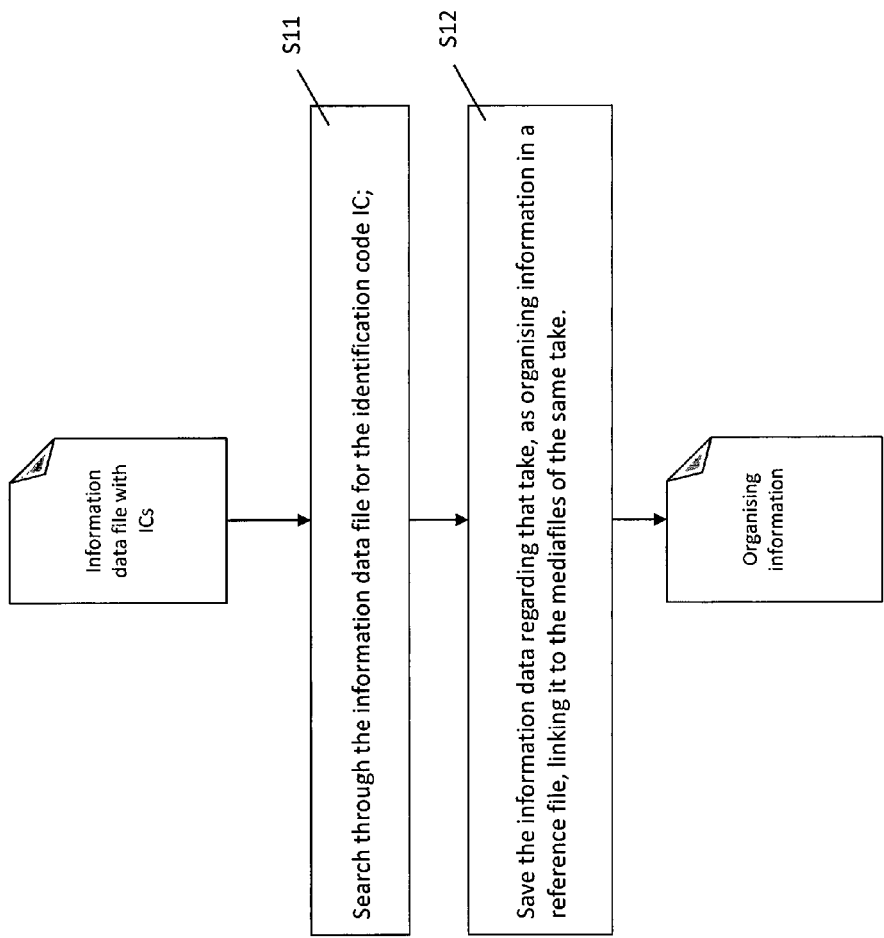
FIG. 7 illustrates a fourth embodiment of the method according to the invention.

It is now referred to FIG. 7, FIG. 12 and FIG. 13. The method here comprises all the steps of the first embodiment above, alternatively it comprises all steps of the second embodiment (hence also including the steps of the first embodiment), alternatively it comprises all steps of the third embodiment (hence also including the steps of the first embodiment and possibly also the steps of the second embodiment).

In the present embodiment, the identification code or codes IC comprises a reference to information data containing information about the present recording stored in an information data file. Hence, the image recordings, the audio recordings and the information data file or files comprises an identification code IC linking them to the other data of the same electronic clap. Thus, the identification code or codes IC encoded into an audible information code AIC or a visual information code VIC constitutes a reference to one specific part of the information data file containing information about that recording.

The term "information data" is here used to denote information about the present recording from different data sources, such as the script log, a camera log (comprising information such as lens type, f-stop, film stock, etc.), a sound log (comprising information about the names, length, quality of the recording, etc. of the sound files), metadata from the image recording and sound recording (such as ISO number, aperture, etc.). The information data may be generated by or in set software such as script logging software, software for making camera reports and software for making sound logs. All software that generates information data is denoted "set software". Information data may be inputted manually or generated automatically by set software. Several implementations of set software may generate information data with identification codes IC that link to the same electronic clap.

The system of the present embodiment 100c comprises a computer device running set software 102.

The clap catalogue is a database created by the electronic clapper device where information about every produced electronic clap is recorded. All desired information from the sensors of the electronic clapper device may be put into the clap catalogue such as the timestamp of the clap, the location of the device, temperature, position of the tablet, etc.

Every entry in the information data may be linked to its matching electronic clap by one or more of several methods:

For each electronic clap an identification code IC may be generated by the electronic clapper device and appear humanly readable on the screen of the electronic clapper device. The identification code IC for each electronic clap may then be manually entered into each entry in information data before transfer to the organising system.

The set software may generate an identification code IC for each entry in the information data. The clapper/loader that operates the electronic clapper device may write each code on the electronic clapper device before the electronic clap is set off. The code can then be encoded into the visual information code VIC and the audible information code AIC constituting the electronic clap.

The identification codes IC of the visual information code VIC and audible information code AIC may be mapped to the identification code or codes IC stored in the entry in the information data when the identification code or codes IC from the information data is entered in to the electronic clapper device after the clap has occurred. Alternatively the identification code IC is brought from the electronic clapper device to the set software and then mapped.

An identification code IC may be generated by either the electronic clapper device or the set software and then wirelessly transmitted to the other device by e.g. internet, Bluetooth or other wireless technology.

The set software may have access to the audible information code AIC e.g. through the computers microphone or by cable, thus gaining access to the identification codes IC outputted by the electronic clapper device by decoding the audible information code AIC.

The set software may have access to the visual information code VIC e.g. by transmittal of the video stream from the camera, either by wire or wirelessly, thus gaining access to the identification codes IC outputted by the electronic clapper device by decoding the visual information code VIC.

The set software may save a timestamp of the electronic clap as an identification code IC e.g. by the script supervisor marking this point in time in the software. The timestamp may then be used to match the timestamp from the clap catalogue. Note that the timestamp don't need to be accurate, just closer in time to its matching timestamp in the clap catalogue than any other timestamps marked by the script supervisor.

A wireless signal may be sent from the electronic clapper device at the time of the clap indicating the point in time of the timestamp.

The identification codes IC gained from the visual information code VIC and the audible information code AIC may be used to link all recorded material that belongs to the same electronic clap with the entries in the clap catalogue and/or the information data relating to the same electronic clap. The clap catalogue and information data such as the sound log or camera report, may be linked to each other by use of an identification code IC.

FIG. 13 shows that the information of the clap catalogue may be coded into the audible information code AIC or the visual information code VIC removing the necessity of the clap catalogue. This however, makes the audible information code AIC and the visual information code VIC more complex, reducing robustness. FIG. 13 further shows linking information data to the electronic clap by use of a timestamp.

The information data from the script log is typically the information written by the script supervisor into the script log software.

In step S11, the method is performing a search through all of the information data files for the identification codes IC.

In step S12, the method is performing storing the information data about the present recording; the metadata from the audio file, the metadata from the video file, the reference to the audio file, the reference to the video file and the data from the clap catalogue as organising information in a reference file.

As mentioned above, the present invention is also comprising an organising system 100, or a system for organising image recordings of takes recorded by an image recorder and sound recordings of the takes recorded by a sound recorder, where the system is configured to perform the method according to one of the embodiments above.

The system 100a (FIG. 3), when performing the first embodiment, may comprise a computer device 101, into which the sound recordings and image recordings are transferred. The method is then performed as a computer program running on the computer device 101.

The system 100b (FIG. 3), when performing the first and second embodiment (and also when performing the third together with the second embodiment) may comprise the computer device 101 and the electronic clapper device 30. Also here the sound recordings and image recordings are transferred.

The system 100c, when performing the first and second embodiment (and also when performing the third and fourth embodiment together with the second embodiment) may comprise the computer device 101 and the electronic clapper device 30 and a further computer device 102. The further computer device 102 is performing the method of generating, automatically or by manual input, the information data that are transferred to the organising system. Also here the sound recordings and image recordings are transferred.

FIG. 12 illustrates the data flow from the apparatuses on the set to the organising system. As seen the identification code IC is coded into the visual information code VIC and audible information code AIC, saved as audio or video in the respective files and then decoded back to the identification code IC in the organising system. In the data flow a file from the electronic clapper device with the sensor data is transferred to the organising system. These data may also be coded into the visual information code VIC and/or the audible information code AIC as seen in FIG. 13.

The preferred embodiment is the fourth embodiment combined with the other embodiments, i.e. a method performing all steps S01, S02, S03, S04, S05, S1, S2, S3, S4, S5, S6, S7, S8, S9, S10, S11 and S12. The method is then performed as a computer program running on the computer device 101 and the application running on the electronic clapper device 30.

Figure 8:
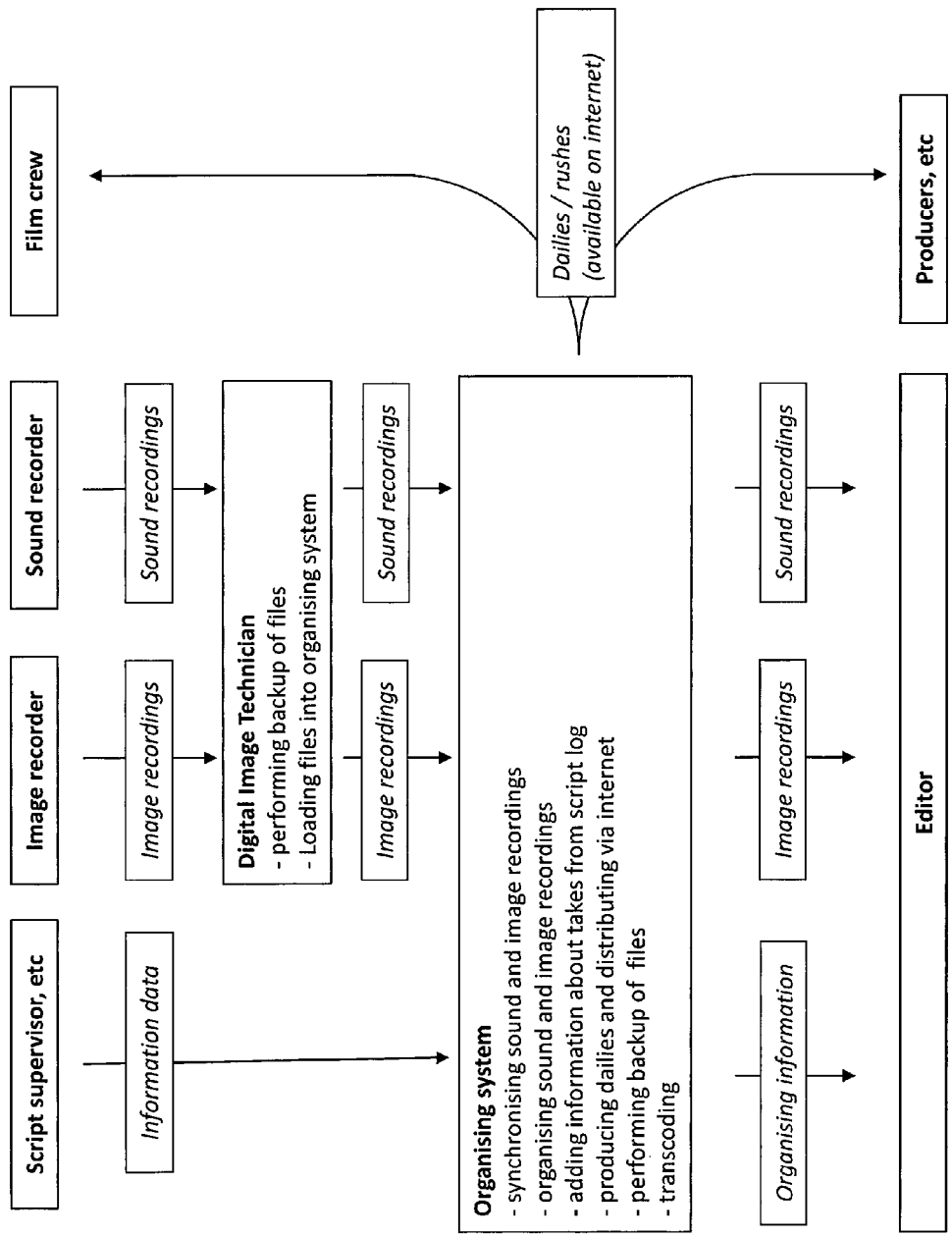
FIG. 8 illustrates the workflow of organising image recordings and sound recordings and preparing them for the editing process according to the present invention.
Figure 9:
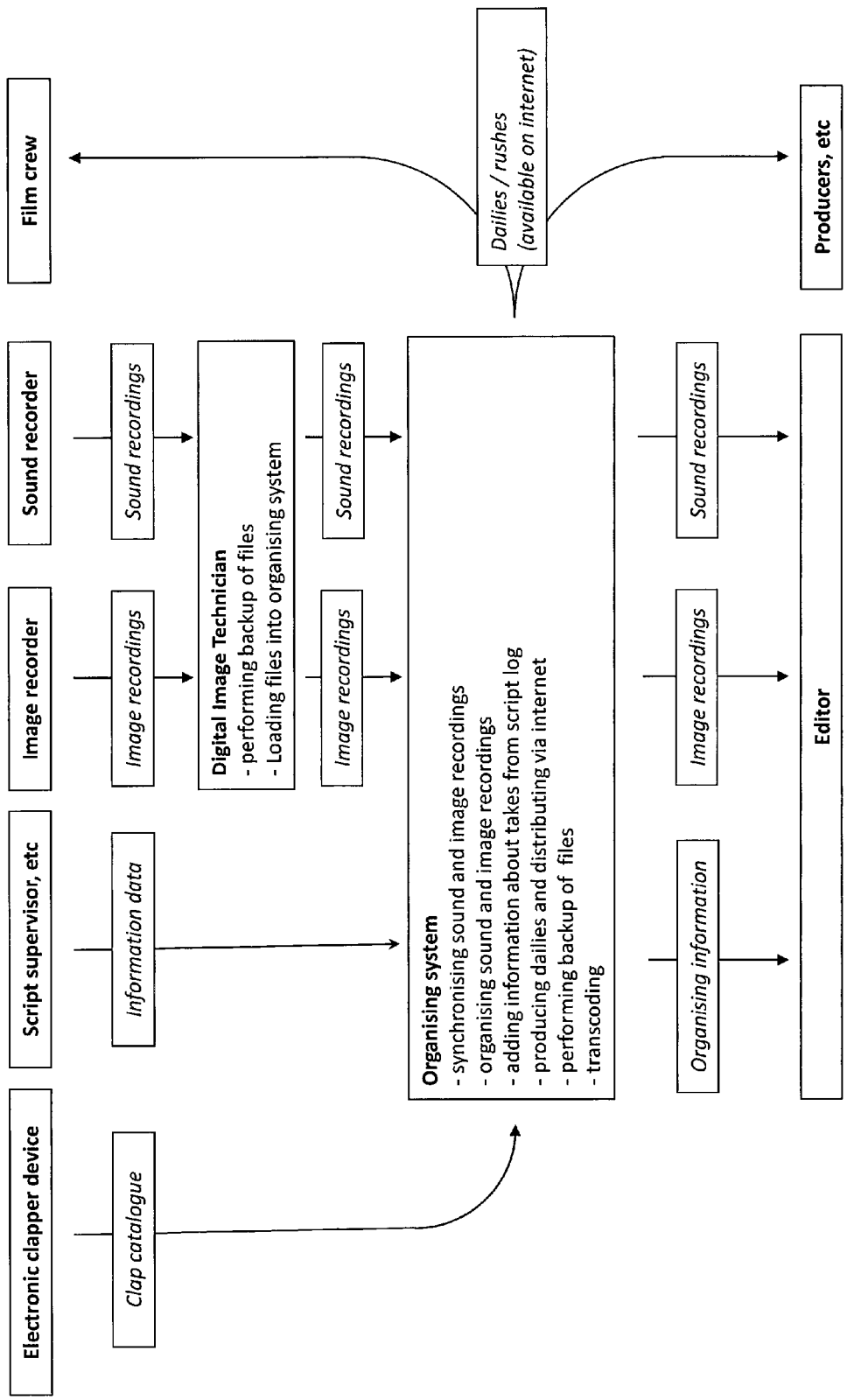
FIG. 9 illustrates the workflow of organising image recordings and sound recordings and preparing them for the editing process according to the present invention with the help of a clap catalogue transferred from the electronic clapper device to the organising system.

It is now referred to FIG. 8. According to this embodiment, the achievement is a method and hence a system that simplifies the process of organising image recordings and sound recordings before they are ready for the editing process. When comparing FIG. 8 and FIG. 9 with FIG. 1, the described system is performing many of the manual tasks of FIG. 1 automatically. Most important, the work performed by the logger may be eliminated, since the identification of the pairs of sound recordings and image recordings are performed automatically by means of the system itself. Moreover, also the synchronisation of these sets of sound and image recordings is performed automatically by means of the system itself. Moreover, also the information data (as defined above) is added and organised together with the sound and image recordings and prepared for the editing tool.

The invention claimed is:

1. Method for organizing image recordings of takes recorded by an image recorder and sound recordings of the takes recorded by a sound recorder, where the image recordings each comprises a visual information code (VIC), said VIC being a visual encoding of an identification code (IC) that is computer readable, and where the sound recordings each comprises an audible information code (AIC), said AIC being an audible encoding of an identification code (IC) that is computer readable, where the method comprises the steps of:
  searching through the digital image recordings for the visual information codes (VIC) and decoding them to acquire the identification codes (IC);
  searching through the digital sound recordings for the audible information codes (AIC) and decoding them to acquire the identification codes (IC);
  organizing sets of image recordings and sound recordings based on their identification codes (IC)
wherein the video information code (VIC) comprises a unique computer readable symbol and the audible information code (AIC) comprises a unique computer readable sound signal, and further wherein the image recordings each also comprises a visual synchronization indicator (VSI), and where the sound recordings each also comprises an audible synchronization indicator (ASI), and where the method further comprises the steps of:
  searching through the image recordings for the visual synchronization indicators (VSI);
  searching through the sound recordings for the audible synchronization indicators (ASI);
  synchronizing the sets of image recordings and sound recordings based on synchronization information respectively from the visual synchronization indicators (VSI) and the audible synchronization indicators (ASI).

2. Method according to claim 1, where the visual information code (VIC) is provided into the image recordings by the step of:
  outputting the visual information code (VIC) on a display of an electronic clapper device to the image recorder during the recording of each take.

3. Method according to claim 1, where the audible information code (AIC) are provided into the sound recordings by the step of:
  outputting the audible information code (AIC) by means of a speaker of an electronic clapper device to the sound recorder during the recording of each take.

4. Method according to claim 3, further comprising the step of:
  outputting the visual information code (VIC) and the audible information code (AIC) in a predetermined way.

5. Method according to claim 1, where the visual synchronization indicator (VSI) is provided into the image recordings by the step of:
  outputting the visual synchronization indicator (VSI) on the display of the electronic clapper device to the image recorder during the recording of each take.

6. Method according to claim 5, where the step of outputting the visual synchronization indicator (VSI) comprises:
  changing the appearance of the visual information code (VIC).

7. Method according to claim 5 or 6, where the step of outputting the visual synchronization indicator (VSI) comprises:
  changing a synchronization indicator.

8. Method according to claim 1, where the audible synchronization indicator (ASI) is provided into the sound recordings by the step of:
  outputting the audible synchronization indicator (ASI) by means of a speaker of an electronic clapper device to the sound recorder during the recording of each take.

9. Method according to claim 8, where the step of outputting the audible synchronization indicator (ASI) comprises:
  outputting a sound signal after, during, before or as part of the audible information code (AIC).

10. Method according to claim 1, where the image recordings each comprises a visual information code (IC) comprising a reference to information data containing information about the present recording stored in an information data file, where the method comprises the step of:
  searching through each image recording for the respective visual information code (IC);
  searching through the information data file for the visual information code (IC);
  storing the information data about the present recording from the information data file for the synchronized sets of image recordings and sound recordings.

11. Method according to claim 1, where the electronic clapper device is a tablet.

* * * * *